United States Patent
Zhang et al.

(10) Patent No.: US 10,450,929 B2
(45) Date of Patent: Oct. 22, 2019

(54) ANTI-ICING SYSTEM AND METHOD FOR GAS TURBINE EXHAUST SECTIONS

(71) Applicant: General Electric Company, Schenectady, NY (US)

(72) Inventors: Hua Zhang, Greer, SC (US); Parag Prakash Kulkarni, Niskayuna, NY (US); Bradly Aaron Kippel, Greenville, SC (US)

(73) Assignee: General Electric Company, Schenectady, NY (US)

( * ) Notice: Subject to any disclaimer, the term of this patent is extended or adjusted under 35 U.S.C. 154(b) by 712 days.

(21) Appl. No.: 15/001,823

(22) Filed: Jan. 20, 2016

(65) Prior Publication Data
US 2017/0204771 A1    Jul. 20, 2017

(51) Int. Cl.
*F01N 9/00* (2006.01)
*F01N 3/05* (2006.01)
(Continued)

(52) U.S. Cl.
CPC .............. *F01N 9/00* (2013.01); *F01D 25/305* (2013.01); *F01N 3/05* (2013.01); *F01N 3/2066* (2013.01);
(Continued)

(58) Field of Classification Search
CPC ... F01N 3/05; F01N 3/306; F01N 3/30; F01N 3/303; F01N 3/305; F01N 3/2066; F01N 2610/00; F01N 2610/08; F01N 2610/085; F01N 3/0205; F01N 3/32; F01N 3/2892; F01N 3/22; F01N 2610/02; F01N 9/00; F01N 13/009; F01N 11/002; F01N 2240/20; F01N 2550/00; F01D 25/30; F01D 25/305; F05D 2270/082; F05D 2270/00; F05D 2270/02; F05D 2270/10; F02C 7/18;
(Continued)

(56) References Cited

U.S. PATENT DOCUMENTS

| 5,282,355 A | * | 2/1994 | Yamaguchi | ........ B01D 53/8631 |
| | | | | 60/39.182 |
| 5,555,718 A | * | 9/1996 | Anderson | .............. B01D 53/79 |
| | | | | 60/39.182 |

(Continued)

OTHER PUBLICATIONS

Extended European Search Report and Opinion issued in connection with corresponding EP Application No. 17151786.5 dated May 29, 2017.

*Primary Examiner* — Alain Chau
(74) *Attorney, Agent, or Firm* — Fletcher Yoder, P.C.

(57) ABSTRACT

A system includes a system includes an exhaust section which receives an exhaust flow of a gas turbine, where the exhaust section includes a catalyst assembly. The system includes an exhaust duct coupled to the diffuser section upstream of the catalyst assembly, where the exhaust duct extracts a return portion of the exhaust flow. The system includes a filter house coupled to the exhaust duct, where the filter house is receives a combined flow of an ambient air flow and the return portion. The system includes a return conduit coupled to the filter house and the exhaust section, where the return conduit is coupled to the exhaust section upstream of the exhaust duct. The return conduit directs the combined flow to the exhaust section, and the catalyst assembly receives a mixed flow including the exhaust flow and the combined flow.

20 Claims, 3 Drawing Sheets

(51) Int. Cl.

| | | |
|---|---|---|
| *F01N 3/20* | (2006.01) | |
| *F01D 25/30* | (2006.01) | |
| *F01N 3/22* | (2006.01) | |
| *F01N 3/28* | (2006.01) | |
| *F01N 3/30* | (2006.01) | |
| *F01N 3/32* | (2006.01) | |
| *F01N 11/00* | (2006.01) | |
| *F01N 13/00* | (2010.01) | |

(52) U.S. Cl.
CPC ............ *F01N 3/22* (2013.01); *F01N 3/2892* (2013.01); *F01N 3/30* (2013.01); *F01N 3/32* (2013.01); *F01N 11/002* (2013.01); *F01N 13/009* (2014.06); *F01N 2240/20* (2013.01); *F01N 2270/02* (2013.01); *F01N 2270/10* (2013.01); *F01N 2550/00* (2013.01); *F01N 2610/02* (2013.01); *F01N 2610/08* (2013.01); *F01N 2900/0416* (2013.01); *F01N 2900/1404* (2013.01); *F05D 2270/082* (2013.01); *Y02T 10/24* (2013.01); *Y02T 10/47* (2013.01)

(58) Field of Classification Search
CPC .. F02C 7/185; F02C 7/12; F02C 7/141; F02C 6/18; B01D 2251/206–2067; B01D 53/8625; B01D 53/8628; B01D 53/8631; F01C 2900/0416; F01C 2900/1404; Y02T 10/24; Y02T 10/47
See application file for complete search history.

(56) References Cited

U.S. PATENT DOCUMENTS

| | | | | |
|---|---|---|---|---|
| 5,946,901 | A  * | 9/1999 | Bauver | F22B 1/1815 122/7 R |
| 6,878,359 | B1 * | 4/2005 | Mathes | B01D 53/8631 423/235 |
| 7,069,716 | B1 | 7/2006 | Childers | |
| 7,578,369 | B2 * | 8/2009 | Francisco | F01D 25/30 181/213 |
| 8,186,152 | B2 | 5/2012 | Zhang et al. | |
| 8,516,786 | B2 | 8/2013 | Zhang et al. | |
| 8,596,073 | B2 | 12/2013 | Zhang | |
| 9,593,609 | B2 * | 3/2017 | Broderick | F23J 15/003 |
| 2006/0213183 | A1 * | 9/2006 | Althaus | F01D 25/305 60/274 |
| 2009/0220401 | A1 | 9/2009 | Nakagawa et al. | |
| 2013/0031910 | A1 | 2/2013 | Merchant et al. | |
| 2014/0096532 | A1 * | 4/2014 | Broderick | F23J 15/003 60/774 |
| 2014/0157778 | A1 * | 6/2014 | Ponnuraj | F01D 25/305 60/694 |
| 2015/0354430 | A1 * | 12/2015 | Cheater | F01N 13/004 60/324 |
| 2016/0376961 | A1 * | 12/2016 | Kulkarni | F01N 3/05 60/39.5 |
| 2017/0175604 | A1 * | 6/2017 | Devarakonda | F01N 3/208 |
| 2017/0182442 | A1 * | 6/2017 | Kippel | B01D 46/0086 |

* cited by examiner

ANTI-ICING SYSTEM AND METHOD FOR GAS TURBINE EXHAUST SECTIONS

BACKGROUND

The subject matter disclosed herein relates to exhaust gases from turbomachinery, and more specifically, to controlling the temperature of exhaust gases to reduce the occurrence of ice forming on a filter house or other equipment during cold weather conditions.

Exhaust gases from turbomachinery may be subject to emissions regulations. The exhaust gases may be treated by an aftertreatment system to reduce the amount of emissions to an acceptable amount. The effectiveness of certain aftertreatment systems may be affected by the high temperatures of the exhaust gas. As such, cooling of the exhaust gas prior to entering the aftertreatment system may improve the effectiveness of the aftertreatment systems. However, in some cold weather environments, components utilized to cool exhaust gases, such as the filter house, may experience ice formation during freezing temperatures or during cold weather conditions.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In a first embodiment, a system includes an exhaust section which receives an exhaust flow of a gas turbine, where the exhaust section includes a catalyst assembly. The system includes an exhaust duct coupled to the diffuser section upstream of the catalyst assembly, where the exhaust duct extracts a return portion of the exhaust flow. The system includes a filter house coupled to the exhaust duct, where the filter house receives a combined flow of an ambient air flow and the return portion. The system includes a return conduit coupled to the filter house and the exhaust section, where the return conduit is coupled to the exhaust section upstream of the exhaust duct. The return conduit directs the combined flow to the exhaust section, and the catalyst assembly receives a mixed flow including the exhaust flow and the combined flow.

In a second embodiment, a system includes an exhaust flow from a gas turbine engine, where the exhaust flow includes a main flow directed through an exhaust section and a return portion extracted through an exhaust duct. The system includes a combined flow from a filter house directed to the exhaust flow through a return conduit upstream of a catalyst assembly of the exhaust section, where the combined flow includes an ambient air flow and the return portion, and a first temperature of the combined flow through the filter house is greater than 0 degrees Celsius. The system includes a mixed flow directed through the catalyst assembly of the exhaust section, where the mixed flow includes the main flow and the combined flow. A second temperature of the mixed flow through the catalyst assembly is less than approximately 482 degrees Celsius.

In a third embodiment, a method includes directing an exhaust flow from a gas turbine engine through an exhaust section. The method includes extracting a return portion of the exhaust flow from the exhaust section. The method includes heating an ambient air flow with the return portion and mixing the heated ambient air flow with the exhaust flow in the exhaust section. The method includes directing a mixed flow through a catalyst assembly, where the mixed flow includes the exhaust flow and the heated ambient air flow.

BRIEF DESCRIPTION OF THE DRAWINGS

These and other features, aspects, and advantages of the present subject matter will become better understood when the following detailed description is read with reference to the accompanying drawings in which like characters represent like parts throughout the drawings, wherein.

DETAILED DESCRIPTION

Figure 1:
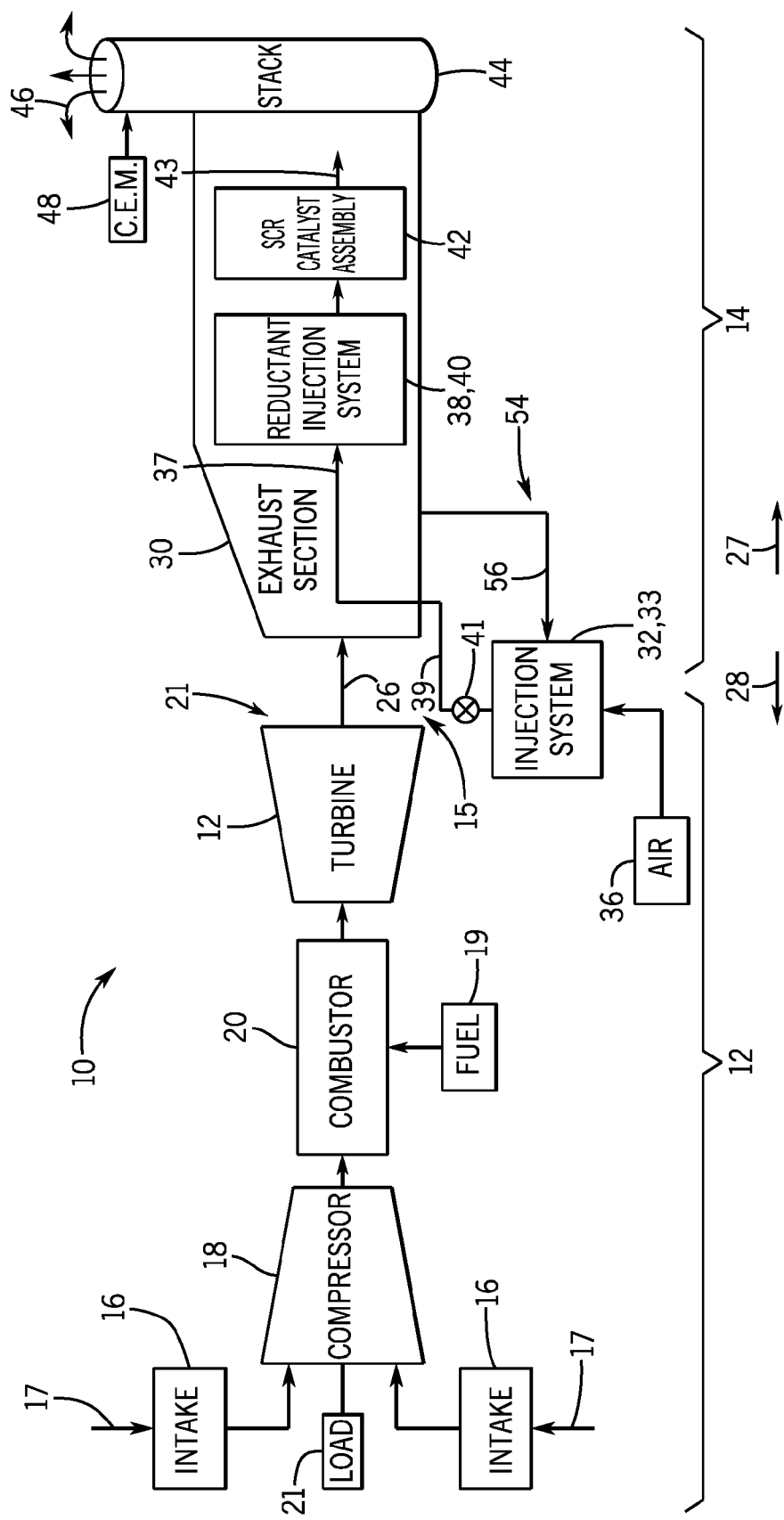
FIG. 1 is a block diagram of a turbine system that includes an injection system for cooling exhaust gases.

One or more specific embodiments of the present subject matter will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements.

A system and a method for cooling the temperature of exhaust gases exiting a turbomachine before entering an aftertreatment system is described in detail below. The embodiments of the present invention generally relate to techniques for cooling an exhaust gas flow. In gas turbine systems, one or more gas turbine engines may combust a fuel to produce combustion gases for driving one or more turbine blades. Depending on the type of fuel that is combusted, emissions in the exhaust gases resulting from the combustion process may include nitrogen oxides ($NO_x$), sulfur oxides ($SO_x$), carbon oxides ($CO_x$), and unburned hydrocarbons. Often, the composition of exhaust gases released by gas turbine systems, such as a gas turbine power generation plant, are subject to stringent emissions regulations.

One technique for removing or reducing the amount of $NO_x$ in an exhaust gas stream is by utilizing a Selective Catalytic Reduction (SCR) catalyst assembly or other suitable catalyst assemblies. In the SCR catalyst assembly, a reductant (e.g., ammonia ($NH_3$)) is injected into the exhaust gas stream and reacts with the $NO_x$ to form resulting nitrogen ($N_2$) and water ($H_2O$). The effectiveness of the SCR catalyst assembly may be at least partially dependent upon the temperature of the exhaust gas that is processed. For example, the SCR catalyst assembly may be particularly effective at temperatures of approximately 260 to 482 degrees Celsius (° C.) (or 500 to 900 degrees Fahrenheit (° F.)). Thus, where the exhaust gas output from the turbine engine is higher than the effective temperature range for the SCR catalyst assembly, it may be beneficial to cool the exhaust gases prior to flowing into the SCR catalyst assembly to increase the conversion efficiency of the $NO_x$ reduction reactions.

As such, in accordance with embodiments of the present techniques, a gas turbine system, such as a simple cycle gas turbine system, may include an injection system configured to inject cooling air into an exhaust gas stream. As will be described further below, the injection system may be disposed downstream (i.e., relative to the flow of exhaust gases) of a turbine, but upstream from a SCR catalyst assembly. The injection system may be disposed partially or entirely within an exhaust section. The injection system may include a plurality of pipes, each having a plurality of injection holes or openings for injecting a cooling fluid (e.g., combined flow including a return portion of exhaust gas and ambient air) into the exhaust gas stream. One or more manifolds may be coupled to the injection system to distribute a return portion of the exhaust flow to the injection tubes of the air injection system. A portion of the exhaust flow may be supplied from the turbine and may be combined with a flow of ambient air to form a combined flow. The combined flow may be combined with a main flow of the exhaust gas to form a mixed flow.

In accordance with these presently disclosed techniques, the mixing structure (e.g., perforated plate) may aid with mixing of combined flow into the exhaust gas stream to form the mixed flow. The mixing structure may increase mixing by utilizing the injection system to inject air to provide for improved uniformity in temperature and/or velocity distributions of the mixed flow received by the SCR system. Further, while the presently disclosed techniques may be particularly useful in simple cycle gas turbine systems, as will be discussed below, it should be understood that the present technique may be implemented in any suitably configured system, including combined cycle gas turbine systems, for example. The temperature of the combined flow, the mixed flow, and the main flow (e.g., exhaust flow) may be controlled by a controller based at least in part on the temperature of the exhaust flow and the ambient air flow. In the present embodiments, the temperature control of the combined flow is accomplished by directing a return portion of the exhaust flow into the ambient air, which may then be drawn into the filter house by a pump or other air flow equipment. The present embodiments may be suited for cold weather conditions, such that ice formation is reduced or eliminated on and around the filter house and the return conduit. Additionally, the present embodiments do not utilize steam to reduce the formation of ice on the equipment.

Turning now to the drawings, FIG. 1 illustrates a block diagram of a turbine system 10 that includes an injection system for cooling exhaust gases, in accordance with an embodiment of the present techniques. The turbine system 10 includes a turbine engine 12 and an aftertreatment system 14. In certain embodiments, the turbine system 10 may be a power generation system. The turbine system 10 may use liquid or gas fuel, such as natural gas and/or a hydrogen-rich synthetic gas, to run the turbine system 10. As shown, the turbine system 10 includes an air intake section 16, a compressor 18, a combustor section 20, and the turbine 12. The turbine 12 may be drivingly coupled to the compressor 18 via a shaft. In operation, air enters the turbine system 10 through the air intake section 16 (indicated by the arrows 17) and is pressurized in the compressor 18. The compressor 18 may include a plurality of compressor blades coupled to the shaft. The rotation of the shaft causes rotation of the compressor blades, thereby drawing air into the compressor 18 and compressing the air prior to entry into the combustor section 20.

As compressed air exits the compressor 18 and enters the combustor section 20, the compressed air 17 may be mixed with fuel 19 for combustion within the combustor. For example, the combustors may include one or more fuel nozzles that may inject a fuel-air mixture into the combustor in a suitable ratio for optimal combustion, emissions, fuel consumption, power output, and so forth. The combustion of the air 17 and fuel 19 generates hot pressurized exhaust gases, which may then be utilized to drive one or more turbine blades within the turbine 12. In operation, the combustion gases flowing into and through the turbine 12 flow against and between the turbine blades, thereby driving the turbine blades and, thus, the shaft into rotation to drive a load 21, such as an electrical generator in a power plant. As discussed above, the rotation of the shaft also causes blades within the compressor 18 to draw in and pressurize the air received by the intake 16.

The combustion gases that flow through the turbine 12 may exit the downstream end 15 of the turbine 12 as a stream of exhaust gas 26. The exhaust gas stream 26 may continue to flow in the downstream direction 27 towards the aftertreatment system 14. For instance, the downstream end 15 may be fluidly coupled to the aftertreatment system 14 and, particularly, to an exhaust section 30. As discussed above, as a result of the combustion process, the exhaust gas 26 may include certain byproducts, such as nitrogen oxides ($NO_x$), sulfur oxides ($SO_x$), carbon oxides ($CO_x$), and unburned hydrocarbons. Due to certain regulations, the aftertreatment system 14 may be employed to reduce or substantially minimize the concentration of such byproducts prior to releasing the exhaust gas stream into the atmosphere.

As mentioned above, one technique for removing or reducing the amount of $NO_x$ in an exhaust gas stream is by using a Selective Catalytic Reduction (SCR) catalyst assembly. For example, the SCR catalyst assembly removes $NO_x$ from the exhaust gas stream 26 by injecting a reductant such as ammonia ($NH_3$) into the exhaust gas stream to react with the $NO_x$ to produce nitrogen ($N_2$) and water ($H_2O$). As will be appreciated, the effectiveness of this SCR catalyst assembly may be at least partially dependent upon the temperature of the exhaust gas that is processed. For instance, the SCR catalyst assembly for removing $NO_x$ may be particularly effective at temperatures of approximately 260 to 482 degrees Celsius (° C.) (or 500 to 900 degrees Fahrenheit (° F.)). In certain embodiments, however, the exhaust gas 26 exiting the turbine 22 and entering the exhaust section 30 may have a temperature of around 590 to 650 degrees Celsius (° C.) (or approximately 1100 to 1200 degrees Fahrenheit (° F.)). Accordingly, to increase the effectiveness of the SCR process for $NO_x$ removal, the aftertreatment system 14 may include an injection system 32 configured to inject a cooling fluid (e.g., the combined flow) into the exhaust gas stream 26, thereby cooling the exhaust gas stream 26 prior to SCR. The combined flow 39, as discussed in detail below, may be a return portion 56 of exhaust gas and ambient air 36. It should be understood that the effective temperatures may vary depending on the element being removed from the gas stream 26 and/or the catalyst being employed.

The injection system 32 may be disposed entirely or partially within the exhaust section 30. In one embodiment, the injection system 32 may include a plurality of injection tubes. Each of the injection tubes may include a plurality of injection holes configured to inject ambient air 36 into the exhaust section 30 for mixture with the exhaust gas stream 26. In one embodiment, a filter house 33 associated with the injection system 32 may include one or more air blowers, fans, or a combination thereof. As will be appreciated, the term "cooling," when used to describe the air flow 36, should be understood to mean that the ambient air 36 is cooler relative to the exhaust gas stream 26 exiting the turbine 22. The injection system 32 may also include a valve 41 for regulating the flow of ambient air 36, the return portion 56, or a combination thereof. The exhaust gas 26 output from the turbine 22 and the ambient air 36 may flow into the exhaust section 30 at different rates. The ambient air 36 mixes with a return portion 56 of the exhaust gas stream 26 that is directed through an exhaust flow duct 54 in order to achieve a combined flow 39. As will be discussed further below, the exhaust section 30 may include a mixing plate including a plurality of holes, which may be suitably configured to provide generally uniform mixing, thus achieving a generally uniform temperature and velocity distribution in the mixed flow 37 prior to flowing into the SCR catalyst assembly 42.

Referring still to FIG. 1, the mixed flow 37 may continue flowing downstream (e.g., in direction 27) through a reductant injection system 38. The reductant injection system 38 may be configured to inject a suitable reductant (e.g., ammonia ($NH_3$) or urea) 40 into the mixed flow 37. Further downstream, the SCR catalyst assembly 42 may be implemented to reduce emissions. Within the SCR catalyst assembly 42, the reductant 40 (e.g., ammonia, urea) acts as a catalyst to react with the $NO_x$ in the mixed flow 37 to produce nitrogen ($N_2$) and water ($H_2O$), thereby removing $NO_x$ emissions from the mixed flow 37 prior to release into the atmosphere through the stack 44, as indicated by the arrows 46. It may appreciated that the SCR catalyst assembly 42 may be implemented using any suitable geometry, such as a honeycomb or plate configuration. The stack 44, in some embodiments, may include a silencer or muffler.

While the present embodiment is generally focused on the processing and removal of $NO_x$ from the exhaust gas stream 26, other embodiments may provide for the removal of other combustion byproducts, such as carbon monoxide or unburned hydrocarbons. As such, the supplied catalyst may vary depending on the composition that is being removed from the exhaust gas stream 26. The temperatures of the combined flow 39 and the mixed flow 37 may vary according to the catalyst assemblies utilized, which in turn may affect the amount of cooling fluid (e.g., combined flow 39) utilized to control the temperature of the mixed flow 37. For example, some embodiments may utilize an oxidation catalyst assembly to reduce combustion byproducts. Additionally, it should be understood that the embodiments disclosed herein are not limited to the use of one SCR catalyst assembly 42, but may also include multiple SCR catalyst assemblies 42 or other catalyst assemblies. Still further, the system 10 may also include a continuous emissions monitoring (CEM) system 48 that continuously monitors the composition of the processed exhaust stream 43 exiting the stack 44. If the CEM system 48 detects that the composition of processed exhaust stream 43 fails to comply with one or more emissions regulations, the CEM system 48 may provide notification to an appropriate entity, which may be tasked with instigating further action, such as notifying the operators of the system 10 to adjust operating parameters, perform service, or otherwise cease operating the system 10. In some embodiments, the CEM system 48 may also implement corrective actions, such as adjusting temperature, flow rates of cooling air 36, flow rates of the return portion 56, an amount of reductant (e.g., $NH_3$) injected into the exhaust section 30, etc.

Figure 2:
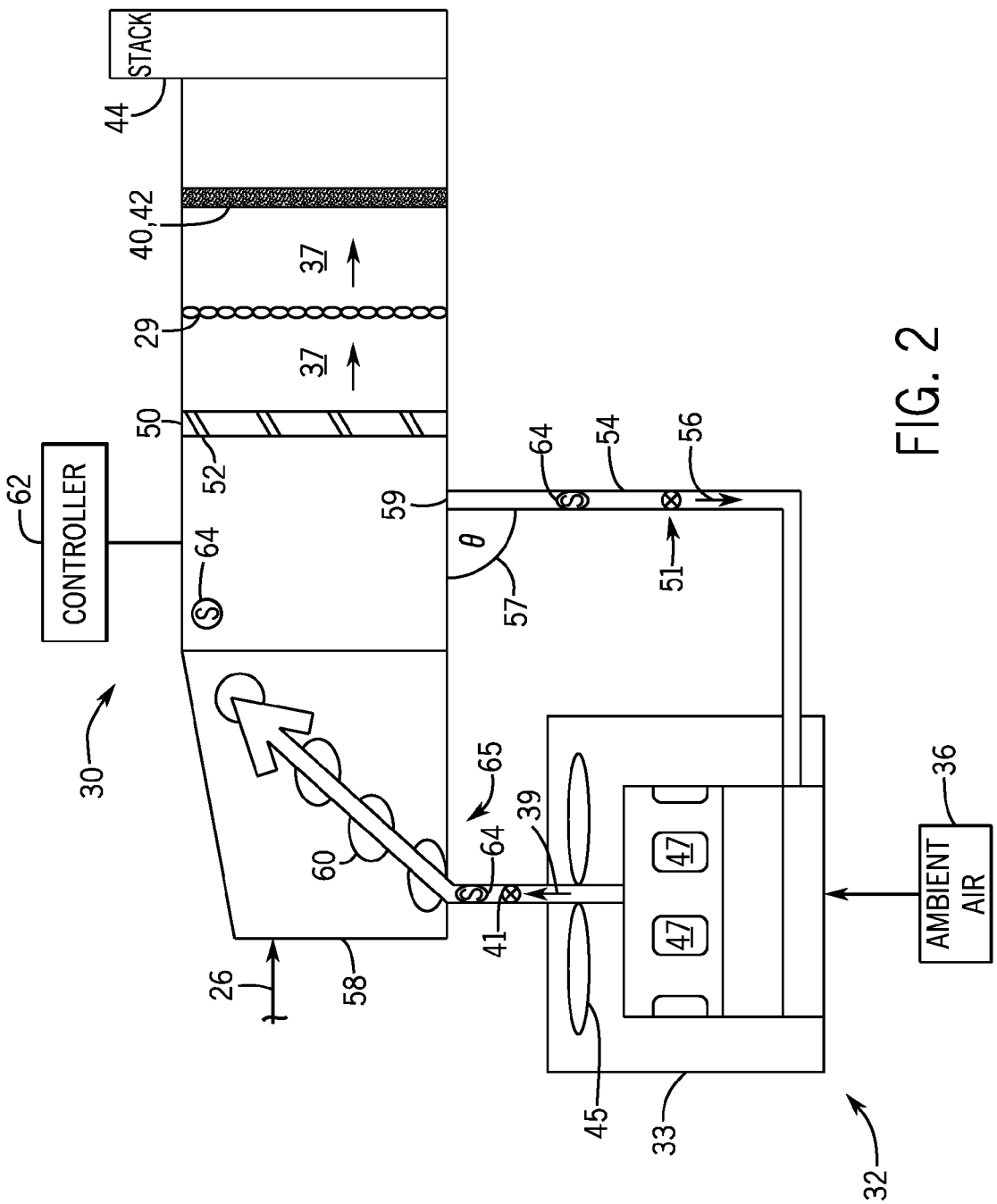
FIG. 2 is a block diagram of an embodiment of the injection system coupled to the exhaust section of the turbine system 10 of FIG. 1.

FIG. 2 is a block diagram of an embodiment of the injection system 32 coupled to the exhaust section 30 of the turbine system 10 of FIG. 1. As depicted, the exhaust section 30 is coupled to an exhaust stack 44. As discussed above, the exhaust stack 44 removes emissions (e.g., $NO_x$ emissions) from the mixed flow 37 prior to releasing the remaining mixed flow 37 into the atmosphere through the stack 44. The amount of emissions may be further reduced by a second catalyst assembly 29 disposed within the exhaust section 30. For example, the second catalyst assembly 29, such as an oxidation catalyst or a CO catalyst, maybe utilized within the exhaust section 30 upstream of the of the SCR catalyst assembly 42. Also disposed within the exhaust section 30 may be a mixing structure (e.g., a perforated plate 50) or other uniform flow equipment. The perforated plate 50 may include a plurality of holes 52 or apertures to provide openings for the mixed flow 37 to flow through. The perforated plate 50 may help with mixing to produce a substantially homogenous mixture of the combined flow (e.g., the return portion 56, and the ambient air 36 flow) and the main flow (e.g., the exhaust flow 26) to achieve a uniform temperature distribution.

Moreover, the perforated plate 50 may improve the uniformity of the mixed flow 37 (e.g., combined flow 39 and exhaust gas stream 26) before the mixed flow 37 enters the catalyst assemblies (e.g., the SCR catalyst assembly 42), thereby improving emissions reduction of the mixed flow 37. The perforated plate 50 may have other shaped holes or openings, such circular, ovular, triangular, square, rectangular, or other polygonal shapes. Additionally, the holes and openings may be disposed in various patterns, shapes, or sizes (e.g., a grid of holes, parallel rows of holes, and so forth) to improve the uniformity of the mixed flow 37.

The exhaust section 30 is coupled to the filter house 33 of the injection system 32 upstream of the catalyst assembly 42 (e.g., the SCR catalyst assembly). In some embodiments, the filter house 33 may be partially disposed within the exhaust section 30 or it may be disposed outside of the exhaust section 30. The exhaust flow duct 54 may be coupled to the exhaust section 30 to direct a return portion 56 of the exhaust flow to the filter house 33. The return portion 56 may enter the exhaust flow duct 54 through a return opening 59. The exhaust flow duct 54 may be disposed at an angle 57 relative to the exhaust section 30. For example, the exhaust flow duct 54 may be disposed at an angle 57 of approximately 90 degrees relative to the exhaust section 30. In other embodiments, the angle 57 may be approximately 30 to 175 degrees, approximately 60 to 100 degrees relative to the exhaust section 30, and any angle therebetween. As the angle size 57 decreases, the amount of flow extracted as the return portion 56 may be less than when the angle 57 is larger due to the flowpath through the return opening with a smaller angle 57.

The filter house 33 receives the return portion 56 and combines the return portion 56 with the ambient air 36 to produce the combined flow 39. The combined flow 39 enters the exhaust section 30 through a return conduit 65. The ratio of the return portion 56 of the exhaust flow 26 and the ambient air 36 may vary, based at least in part on the temperature of the exhaust flow 26 and the temperature of the ambient air 36. In some embodiments, the combined flow 39 includes a non-zero portion of the return portion 56. The non-zero portion of the return portion 56 may range from approximately 0.1 to 15%, 0.5 to 10%, 1 to 5%, and all percentages therebetween.

The filter house 33 may include a pump, a fan 45, a compressor, or other air circulation equipment to help move the ambient air 36 and the return portion 56 of the exhaust flow 26 through the filter house 33 and into a transition section 58 through the return conduit 65. The filter house 33 may include a filter media 47 to help filter the ambient air 36 and the return portion 56. The return portion 56 and the ambient air 36 may mix to form the combined flow 39 upstream of the fan 45 and the filter media 47 to reduce or eliminate ice formation. The combined flow 39 then flows into the exhaust section 30 via the transition section 58. The return conduit 65 and the transition section 58 may include a plurality of return ports 60. Such return ports are described in U.S. Pat. No. 8,516,786, entitled System and Method for Injection of Cooling Air into Exhaust Gas Flow, issued to Zhang et al. on Aug. 27, 2013; which is hereby incorporated into the present disclosure by reference. The return ports 60 may be of varying sizes, and may be arranged in a various configurations (e.g., parallel, staggered).

The mixed flow 37 may include as much as 10%, 20%, 30%, or up to approximately 40% of the ambient air 36. The ambient air 36 helps reduce the temperature of the exhaust flow 26, such that the temperature of the mixed flow 37 may be less than approximately 400 to 500 degrees Celsius (° C.) (or approximately 750 to 930 degrees Fahrenheit (° F.)). In some embodiments, the mixed flow 37 may be reduced to about 482 degrees Celsius (° C.) at a point upstream of the SCR catalyst assembly 42. Reducing the temperature of the mixed flow 37 to about 482 degrees Celsius (° C.) increases the useful lifespan of the SCR catalyst 42. As will be appreciated, the temperature of the mixed flow 37 may be controlled to facilitate an increase in useful lifespan of other catalyst assemblies (e.g., oxidation catalyst), when they are utilized in the aftertreatment system 14.

The temperature and flow rate of the mixed flow 37 may be controlled by a controller 62. The controller 62 may receive measurements from a plurality of sensors 64 disposed within the aftertreatment system 14, the air injection system 32, the exhaust section 30, or any combination thereof. The sensors 64 may include one or more temperature sensors (e.g., to measure ambient air 36 temperature, combined flow 39 temperature, mixed flow 37 temperature), one or more emissions sensors, one or more flow sensors (e.g., to measure flow rate of the combined flow 39, mixed flow 37), or any combination thereof. The sensors 64 may be disposed along the exhaust flow duct 54, within the filter house 33, along the exhaust section 30, along the return conduit 65, or any combination thereof. The controller 62 may be configured to control one or more control valves (e.g., a valve 41 to control the combined flow 39, a valve 51 to control the return portion 56). The control valves may be configured to control the temperature and/or flow rates of the flows (e.g., return portion 56, combined flow 39). The control valves may also adjust the ratio of the return portion 56 to the exhaust flow 26. Controlling the temperature and/or flow rates of the flows helps reduce or eliminate the formation of ice that may form due to cold weather conditions. As such, adjusting the temperature and/or flow rates of the flows may reduce or eliminate ice formation in or around the filter house 33 and the other associated equipment (e.g., pump, compressor, fan 45), the return conduit 65, and the transition section 58.

In some embodiments, the controller 62 may increase the ambient air flow 36 and/or decrease the return portion 56 when the likelihood of ice formation in or around the filter house 33 is low for current flow rates of the ambient air flow 36 and the return portion 56. In this example, the temperature of the combined flow 39 may be decreased, and the temperature of the mixed flow 37 may also be reduced (e.g., less than 482 degrees Celsius (° C.)). By flowing more ambient air 36 through the filter house 33, the combined flow 39, the mixed flow 37, and the transition section 58 experience reduced temperatures. In some embodiments, the reduced temperature of the mixed flow 37 may increase the useful lifespan of the SCR catalyst assembly 42. Moreover, the reduced temperature of the combined flow 39 may facilitate a reduced return portion 56, thereby reducing any energy losses associated with the return portion 56. Alternatively, the controller 62 may decrease the ambient air flow 36 and/or increase the return portion 56 when the likelihood of ice formation in or around the filter house 33 is high for current flow rates of the ambient air flow 36 and the return portion 56. In this example, the temperature of the combined flow 39 and the mixed flow 37 may be increased. By flowing more of the return portion 56 through the filter house 33, the combined flow 39, the mixed flow 37, and the transition section 58 experience increased temperatures. In some embodiments, the increased temperature of the mixed flow 37 may reduce the useful lifespan of the SCR catalyst assembly 42 in reducing emissions (e.g., $NO_x$ emission) from the combined flow 39. Moreover, the increased temperature of the combined flow 39 may reduce or eliminate ice formation in or around the filter house 33. Additionally, it will be appreciated that in some embodiments, the return portion 56 may heat the ambient air 36 via a heat exchanger without mixing the return portion 56 with the ambient air 36.

Figure 3:
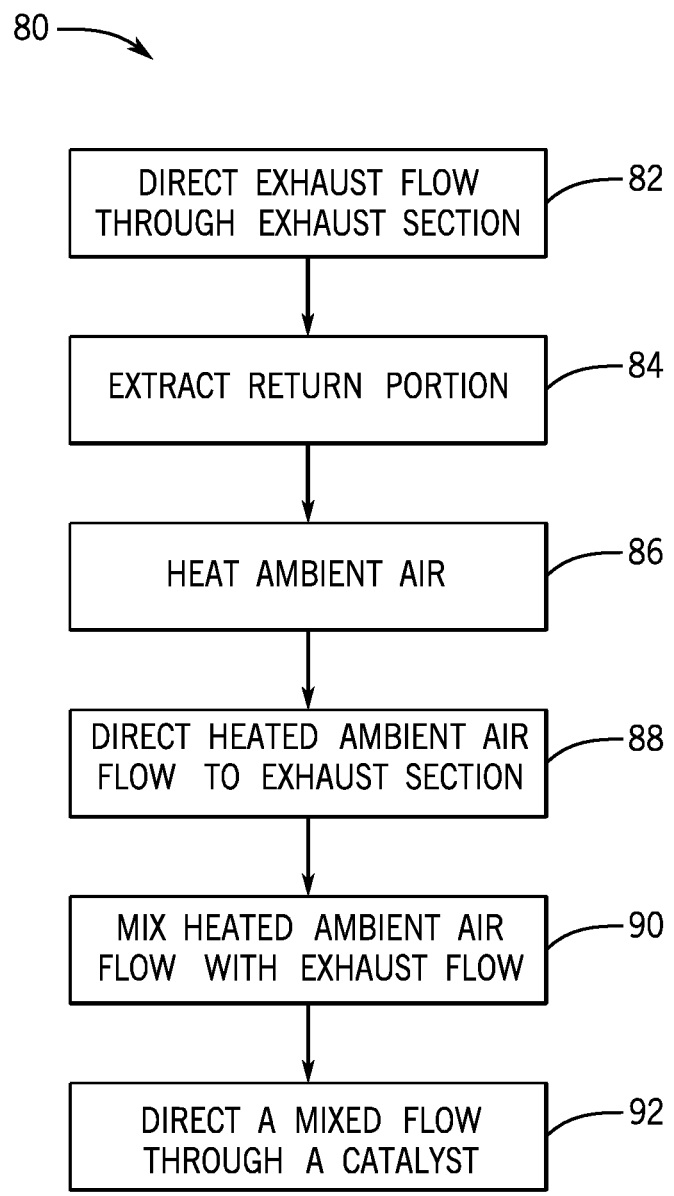
FIG. 3 is a flow chart illustrating an embodiment of a method for injecting a flow for cooling exhaust gases entering an aftertreatment system.

FIG. 3 is a flow chart illustrating an embodiment of a method 80 for injecting a combined flow 39 for cooling exhaust gases 26 entering the aftertreatment system 14. The method 80 includes directing (e.g., block 82) the exhaust flow 26 through the exhaust section. The method 80 includes extracting (e.g., block 84) the return portion 56 of the exhaust flow through the return conduit. The method 80 includes heating (e.g., block 86) the ambient air 36 to reduce or eliminate ice from the filter house, the return conduit, or any combination thereof during cold weather conditions. Without heating, the filter house and/or the return conduit may accumulate ice during cold weather conditions (e.g., ambient air temperature less than 7 degrees Celsius (° C.) (45 degrees Fahrenheit (° F.))). In the illustrated embodiment, heating of the ambient air 36 is accomplished without using steam (such as steam generated by a heat recovery steam generator (HRSG)). The method 80 includes directing (e.g., block 88) the heated ambient air flow to the transition section of the exhaust duct. The method 80 includes mixing (e.g., block 90) the heated ambient air flow with the exhaust flow to form a mixed flow. The method 80 includes directing (e.g., block 92) the mixed flow through the catalyst assembly 42.

Technical effects of the subject matter include controlling the temperature of an exhaust flow by injecting ambient air and using a return portion of the exhaust flow to control the temperature of the injected ambient air. The temperature of the mixed flow formed from the exhaust flow and the injected ambient air flow may be controlled by a controller based at least in part on the temperature of the return portion and the ambient air flow. The temperature control of the combined flow is accomplished by a return portion of the exhaust flow into the ambient air which is drawn into the filter house by a pump or other air flow equipment. The present embodiments may be suited for cold weather conditions, such that ice formation is reduced on and in the filter house and the return conduit. Additionally, the present embodiments do not utilize steam to reduce the formation of ice.

This written description uses examples to disclose the subject matter, including the best mode, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system comprising:
an exhaust section configured to receive an exhaust flow of a gas turbine, wherein the exhaust section comprises a catalyst assembly and a diffuser section upstream of the catalyst assembly;
an exhaust duct coupled to the exhaust section at a return opening upstream of the catalyst assembly, wherein the exhaust duct is configured to extract a return portion of the exhaust flow at the return opening;
a filter house coupled to the exhaust duct, wherein the filter house is configured to receive a combined flow of an ambient air flow and the return portion; and
a return conduit coupled to the filter house and the exhaust section, wherein the return conduit is coupled to the exhaust section at one or more return ports upstream of the return opening coupled to the exhaust duct, the return conduit is configured to direct the combined flow to the exhaust section into the diffuser section, and the catalyst assembly is configured to receive a mixed flow comprising the exhaust flow and the combined flow.

2. The system of claim 1, wherein the return conduit is configured to direct the combined flow into the exhaust flow via the one or more return ports, and the one or more return ports comprise a plurality of return ports.

3. The system of claim 1, comprising a controller and an exhaust control valve coupled to the exhaust duct, wherein the controller is configured to control the exhaust control valve to maintain a temperature of the combined flow above 0 degrees Celsius.

4. The system of claim 1, wherein the catalyst assembly comprises a selective catalyst reduction assembly.

5. The system of claim 4, wherein a temperature of the combined flow at the selective catalyst reduction assembly is between 260 to 540 degrees Celsius.

6. The system of claim 1, wherein the filter house comprises a filter media disposed within the filter housing, and a pump configured to draw the ambient air flow and the return portion into the filter house, wherein the filter media and the pump are configured to reduce ice formation.

7. The system of claim 1, wherein the ambient air flow comprises less than 40 percent of the mixed flow at the catalyst assembly.

8. The system of claim 1, comprising one or more sensors configured to measure at least one of a temperature mixed flow, a temperature of the ambient air, flow rate of the combined flow, or any combination thereof.

9. The system of claim 1, comprising a controller and a return control valve coupled to the return conduit, wherein the controller is configured to control the return control valve to adjust a temperature of the mixed flow in the exhaust section.

10. The system of claim 1, wherein the exhaust section comprises a mixing structure downstream of the one or more return ports coupling the return conduit to the exhaust section, wherein the mixing structure is configured to mix the exhaust flow, the return portion, and the ambient air flow to form the mixed flow.

11. The system of claim 1, wherein the combined flow is directed to a location upstream of the return opening.

12. The system of claim 1, wherein the system does not utilize steam to control a temperature of the combined flow or the mixed flow.

13. A system comprising:
an exhaust flow from a gas turbine engine, wherein the exhaust flow comprises a main flow directed through an exhaust section and a return portion extracted through an exhaust duct coupled to a first port in the exhaust section at a first position that is upstream of a catalyst assembly of the exhaust section;
a combined flow from a filter house directed to the exhaust flow through a return conduit upstream of the catalyst assembly of the exhaust section, wherein the return conduit is coupled to a second port in a diffuser section of the exhaust section upstream from the first port and the combined flow comprises an ambient air flow and the return portion, and a first temperature of the combined flow through the filter house is greater than 0 degrees Celsius;
a mixed flow directed through the catalyst assembly of the exhaust section, wherein the mixed flow comprises the main flow and the combined flow, and a second temperature of the mixed flow through the catalyst assembly is less than 482 degrees Celsius.

14. The system of claim 13, comprising an exhaust control valve configured to control a ratio of the return portion to the main flow based at least in part on the first temperature of the combined flow.

15. The system of claim 13, comprising the catalyst assembly, wherein the catalyst assembly comprises a selective catalyst reduction (SCR) assembly.

16. The system of claim 13, comprising a first temperature sensor configured to monitor the first temperature of the combined flow in the filter house, and a second temperature sensor configured to monitor the second temperature of the mixed flow in the exhaust section.

17. The system of claim 13, wherein the combined flow consists of the ambient air flow and a non-zero return portion.

18. A method comprising:
directing an exhaust flow from a gas turbine engine through an exhaust section;
extracting a return portion of the exhaust flow from the exhaust section at a return opening downstream of a diffuser section and upstream of a catalyst assembly of the exhaust section;
heating an ambient air flow with the return portion of the exhaust flow by combining the return portion of the exhaust flow with the ambient air flow in a filter house and forming a heated ambient air flow;

mixing the heated ambient air flow with the exhaust flow in the diffuser section of the exhaust section upstream of the return opening; and directing a mixed flow through the catalyst assembly, wherein the mixed flow comprises the exhaust flow and the heated ambient air flow.

19. The method of claim 18, wherein the mixed flow comprises the exhaust flow, the heated ambient air flow, and the return portion.

20. The method of claim 18, comprising controlling the ambient air flow and the return portion based at least in part on a temperature of the mixed flow through the catalyst assembly.

* * * * *